United States Patent
Komatsu et al.

(10) Patent No.: US 9,197,290 B2
(45) Date of Patent: *Nov. 24, 2015

(54) COMMUNICATION SYSTEM AND COMMUNICATION DEVICE

(75) Inventors: Yutaka Komatsu, Osaka (JP); Takeshi Hagihara, Osaka (JP); Ryou Okada, Osaka (JP); Yousuke Takata, Osaka (JP); Tatsuya Izumi, Osaka (JP); Kazuhiko Nii, Osaka (JP); Hiroya Andoh, Aichi (JP); Yuta Ochiai, Aichi (JP); Ryuichi Kamaga, Aichi (JP); Atsushi Iwai, Aichi (JP); Yukihiro Miyashita, Aichi (JP); Nobuyuki Nakagawa, Aichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 18 days.

This patent is subject to a terminal disclaimer.

(21) Appl. No.: 14/128,528

(22) PCT Filed: Jun. 21, 2012

(86) PCT No.: PCT/JP2012/065847
§ 371 (c)(1),
(2), (4) Date: May 1, 2014

(87) PCT Pub. No.: WO2012/176833
PCT Pub. Date: Dec. 27, 2012

(65) Prior Publication Data
US 2014/0247893 A1    Sep. 4, 2014

(30) Foreign Application Priority Data

Jun. 21, 2011   (JP) ................................. 2011-137600

(51) Int. Cl.
*H04B 3/54*   (2006.01)
*B60L 11/18*  (2006.01)
*H02J 7/00*   (2006.01)

(52) U.S. Cl.
CPC ............ *H04B 3/54* (2013.01); *B60L 11/184* (2013.01); *B60L 11/1816* (2013.01);
(Continued)

(58) Field of Classification Search
CPC ..... H04B 3/54; H04B 2203/547; H04B 3/548
USPC .......................................................... 375/258
See application file for complete search history.

(56) References Cited

U.S. PATENT DOCUMENTS 5,686,806 A      11/1997  Hibbard
6,091,779 A *    7/2000   Griessbach .................... 375/258
(Continued)

FOREIGN PATENT DOCUMENTS

CN     101803143 A    8/2010
JP     55-66459 U     5/1980
(Continued)

OTHER PUBLICATIONS

Surface Vehicle Recommended Practice, SAE International, Jan. 2010, J1772, pp. 1-51.
(Continued)

*Primary Examiner* — Michael Neff
(74) *Attorney, Agent, or Firm* — McDermott Will & Emery LLP (57) ABSTRACT

Provided are a communication system and a communication device capable of suppressing attenuation of a communication signal superimposed upon a control pilot line. This output circuit (20) sends a control pilot signal which has been generated at a voltage generation source (21) to an input circuit (60). Between the control pilot line (4) and the ground line (3) of the output side of the output circuit (20), a communication unit (30) is connected via a transformer (31). Between the control pilot line (4) and the ground line (3) of the input side of the input circuit (60), a communication unit (70) is connected via a transformer (71). Between the output circuit (20) and the transformer (31), a lowpass filter (33) is interposed. Between the input circuit (60) and the transformer (71), a lowpass filter (73) is interposed.

7 Claims, 10 Drawing Sheets

(52) U.S. Cl.
CPC ........ *B60L 11/1824* (2013.01); *B60L 11/1844* (2013.01); *B60L 11/1846* (2013.01); *H04B 3/548* (2013.01); *B60L 2210/30* (2013.01); *H02J 7/0004* (2013.01); *H04B 2203/547* (2013.01); *Y02E 60/721* (2013.01); *Y02T 10/7005* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 6,278,103 | B1* | 8/2001 | Takami ............ 250/214 R |
| 6,278,357 | B1 | 8/2001 | Croushore et al. |
| 6,285,744 | B1* | 9/2001 | Nero et al. ............. 379/27.01 |
| 2002/0171535 | A1 | 11/2002 | Cern |
| 2003/0076221 | A1 | 4/2003 | Akiyama et al. |
| 2003/0095036 | A1 | 5/2003 | Wasaki et al. |
| 2006/0170285 | A1 | 8/2006 | Morimitsu et al. |
| 2006/0192537 | A1 | 8/2006 | Hagen et al. |
| 2007/0076666 | A1* | 4/2007 | Riveiro et al. ............. 370/335 |
| 2009/0102433 | A1 | 4/2009 | Kamaga |
| 2009/0280757 | A1* | 11/2009 | Zhu et al. ............. 455/114.1 |
| 2010/0303263 | A1* | 12/2010 | Hiensch ............. 381/191 |
| 2011/0127956 | A1 | 6/2011 | Mitsutani |
| 2011/0134976 | A1* | 6/2011 | Fossion et al. ............. 375/222 |
| 2011/0207358 | A1 | 8/2011 | Ichikawa et al. |
| 2012/0002714 | A1 | 1/2012 | Varadarajan et al. |
| 2012/0029728 | A1 | 2/2012 | Hirayama et al. |
| 2013/0154362 | A1 | 6/2013 | Takaka et al. |
| 2014/0192910 | A1* | 7/2014 | Okada et al. ............. 375/258 |
| 2014/0254694 | A1* | 9/2014 | Okada et al. ............. 375/258 |

FOREIGN PATENT DOCUMENTS

| | | |
|---|---|---|
| JP | 61-136327 A | 6/1986 |
| JP | A-S61-136327 A | 6/1986 |
| JP | 2003-218754 A | 7/2003 |
| JP | 2004-304365 A | 10/2004 |
| JP | 2004-532562 A | 10/2004 |
| JP | 2007-013812 A | 1/2007 |
| JP | 2009-106053 A | 5/2009 |
| JP | 2010-123284 A | 6/2010 |
| JP | 2011-109821 A | 6/2011 |
| JP | 2011-172363 A | 9/2011 |
| JP | 2012-034484 A | 2/2012 |
| JP | 2012-151824 A | 8/2012 |
| JP | 2013-038760 A | 2/2013 |
| KR | 10-2009-066385 A | 6/2009 |
| KR | 10-2009-0110789 A | 10/2009 |
| WO | WO02/080396 A | 10/2002 |
| WO | WO2010/055379 A2 | 5/2010 |
| WO | WO2012/176832 A1 | 12/2012 |
| WO | WO2012/176833 A1 | 12/2012 |
| WO | 2013/008903 A1 | 1/2013 |
| WO | 2013/008921 A1 | 1/2013 |
| WO | 2013/008922 A1 | 1/2013 |

OTHER PUBLICATIONS

M.A. Mannah, et al., "Power Line Communication over Feeder Cables in an Industrial Environment," IEEE International Symposium on Power Line Communications and Its Applications, 2009, ISPLC, Mar. 29, 2009, pp. 255-260.

P. Van den Bossche, et al., "Trends and Development Status of IEC Global Electric Vehicle Standards," Journal of Asian Electric Vehicles, vol. 8, No. 2, Dec. 2010, pp. 1409-1414.

C. Bleijs, "Low-cost charging systems with full communication capability," EVS 24 International Battery, Hybrid and Fuel Cell Electric Vehicle Symposium, [online] May 13, 2009, EVS-24-Stavanger, Norway, pp. 1-9 [retrieval date Jul. 13, 2012], Internet, URL:http://www.esc-five.ch/parkcharge/documents/low_cost.pdf.

Surface Vehicle Information Report, SAE International, Jul. 2012, J2931/4, pp. 1-18.

International Search Report issued in International Application No. PCT/JP2012/065847 mailed Jul. 24, 2012, with English translation, 5 pgs.

Extended European Search Report issued in European Applcation No. 12802405.6-1855 dated Nov. 24, 2014.

PCT Application No. PCT/JP2012/065845 (published as WO2012176832): International Search Report (ISA/JP), dated Jul. 24, 2012.

PCT Application No. PCT/JP2012/067895 (published as WO2013/008903): International Search Report (ISA/JPO), dated Aug. 21, 2012.

PCT Application No. PCT/JP2012/067960 (published as WO 2012/008921): International Search Report (ISA/JPO), dated Aug. 21, 2012.

Granado, J. 2010. Modeling Airfield Ground Lighting Systems for Narrowband Power-Line Communications. IEEE Transactions on Power Delivery, vol. 25, No. 4, Oct. 2010, pp. 2399-2405. (#12).

Japan Patent Office 2015. Office Action mailed Sep. 29, 2015 for Japanese Patent Application No. 2013-523992, Japanese counterpart to the instant application.

Bleijs et al. 2009. Low-Cost Charging Systems with Full Communication Capability, May 2009, IEEE.

USPTO. 2015. Office Action dated Sep. 17, 2015 for U.S. Appl. No. 14/128,517, filed May 7, 2014, entitled "Communication System and Communication Device," published on Sep. 11, 2014 as US 2014/0254694 A1.

* cited by examiner

FIG. 5 TRANSMISSION CHARACTERISTICS ON THE INPUT CIRCUIT SIDE

FIG. 9 TRANSMISSION CHARACTERISTICS ON THE INPUT CIRCUIT SIDE

FIG. 10 ELECTRICITY SUPPLY APPARATUS

COMMUNICATION SYSTEM AND COMMUNICATION DEVICE

CROSS-REFERENCE TO RELATED APPLICATIONS

This application is the national phase under 35 U.S.C. §371 of PCT International Application No. PCT/JP2012/065847 which has an International filing date of Jun. 21, 2012 and designated the United States of America.

BACKGROUND

1. Technical Field

The present invention relates to: a communication system achieving communication between a vehicle such as an electric car and hybrid car and an electricity supply apparatus supplying electricity to the vehicle; and a communication device constituting this communication system.

2. Description of Related Art

In recent years, as techniques used for treating global warming, attention is focused on environmental technology. As such environmental technology, for example, electric cars, hybrid cars, and the like in which a secondary battery is mounted and an electric motor is employed as a drive unit in place of a conventional combustion engine that consumes gasoline have been brought into practical use.

Such a vehicle like an electric car and a hybrid car has a configuration that a charging plug connected to an external electricity supply apparatus is connected to the connector of a power feed opening provided in the vehicle so that the secondary battery is allowed to be charged from the outside of the vehicle.

An interface used between a vehicle and an electricity supply apparatus (a charging station) when electricity is to be supplied to the vehicle has already been standardized. For example, a signal line called a control pilot line is provided between an output circuit provided on the electricity supply apparatus side and an input circuit provided on the vehicle side. Then, a rectangular wave signal (a control pilot signal) of given frequency is outputted from the output circuit to the input circuit so that information such as the charging state of the vehicle is allowed to be checked between the electricity supply apparatus and the vehicle (see "SURFACE VEHICLE RECOMMENDED PRACTICE, SAE International (Society of Automotive Engineers International), January 2010.".

On the other hand, a communication system is also investigated in which a communication signal is superimposed on the control pilot line so that various kinds of further information is allowed to be transmitted and received between the electricity supply apparatus and the vehicle.

SUMMARY

Nevertheless, the output and the input of the output circuit and the input circuit transmitting and receiving the control pilot signal are each provided with a capacitor removing a noise or the like. Thus, even when a communication signal is superimposed on the control pilot line, the communication signal is attenuated by the capacitors provided in the output circuit and the input circuit. This causes a possibility of degradation in the transmission speed or degradation in the noise resistance. Further, when the communication circuit superimposing the communication signal is connected to the control pilot line, a possibility also arises that transmission and reception of the control pilot signal is not achieved owing to the influence of the communication circuit.

The present invention has been devised in view of such situations. An object thereof is to provide: a communication system in which attenuation of a communication signal superimposed on a control pilot line is suppressed; and a communication device constituting this communication system.

The communication system according to the first aspect of the present invention is a communication system provided with an output circuit that is provided in an electricity supply apparatus supplying electricity to a vehicle and that outputs a rectangular wave signal of given frequency and with an input circuit that is provided in the vehicle and connected to the output circuit through a plurality of signal lines and that receives the rectangular wave signal outputted by the output circuit, whereby a communication signal is superimposed on the signal lines so that communication is achieved between the vehicle and the electricity supply apparatus, the communication system comprising: a first communication unit provided in the electricity supply apparatus and transmitting and receiving a communication signal via a first transformer connected between the signal lines; a second communication unit provided in the vehicle and transmitting and receiving a communication signal via a second transformer connected between the signal lines; a first lowpass filter interposed between the output circuit and the first transformer; and a second lowpass filter interposed between the input circuit and the second transformer, wherein the first and the second communication units transmit and receive the communication signal by using a communication band of 1 MHz or higher.

The communication system according to the second aspect of the present invention is that each of the first and the second lowpass filters includes an inductor connected in series to the signal line.

The communication system according to the third aspect of the present invention is that each of the first and the second lowpass filters includes a resistor connected in parallel to the inductor.

The communication system according to the fourth aspect of the present invention is that each of the first and the second lowpass filters includes a resistor connected in series to the inductor.

The communication system according to the fifth aspect of the present invention is that in each of the first and the second lowpass filters, a series circuit composed of a capacitor and a resistor is provided between the signal lines of an output side of the inductor.

The communication system according to the sixth aspect of the present invention is that the output circuit outputs a rectangular wave signal of 1 kHz and a rise time and a fall time of the rectangular wave signal on an input side of the input circuit are 10 µs or shorter.

The communication device according to the seventh aspect of the present invention is a communication device provided with an output circuit outputting a rectangular wave signal of given frequency via a plurality of signal lines, comprising: a communication unit superimposing a communication signal onto the signal lines via a transformer connected between the signal lines and thereby transmitting and receiving a communication signal; and a lowpass filter interposed between the output circuit and the transformer.

The communication device according to the eighth aspect of the present invention is that has a generation unit generating the rectangular wave signal; a voltage detection unit detecting an output voltage of the output circuit; and an adjustment unit, in accordance with the voltage detected by the voltage detection unit, adjusting the rectangular wave signal generated by the generation unit.

The communication device according to the ninth aspect of the present invention is a communication device provided with an input circuit receiving a rectangular wave signal of given frequency via a plurality of signal lines, comprising: a communication unit superimposing a communication signal onto the signal lines via a transformer connected between the signal lines and thereby transmitting and receiving a communication signal; and a lowpass filter interposed between the input circuit and the transformer.

The communication device according to the tenth aspect of the present invention is that has a resistor unit including a plurality of resistors in which a resistance thereof is adjustable; and an adjustment unit, in order to change a voltage of the resistor unit, adjusting the resistance of the resistor unit.

In the first, the seventh, and the ninth aspect of the present inventions, the first communication unit is provided in the electricity supply apparatus and then superimposes the communication signal on the signal lines via the first transformer connected between the plurality of signal lines (e.g., the control pilot line and the ground line) arranged between the output circuit and the input circuit so as to transmit and receive the communication signal. Further, the second communication unit is provided in the vehicle and then superimposes the communication signal on the signal lines via the second transformer connected between the plurality of signal lines arranged between the output circuit and the input circuit so as to transmit and receive the communication signal. That is, in the first and the second communication units, a transformer is connected between the signal lines and then a voltage is superimposed between the signal lines so that communication is achieved. The communication band used by the first and the second communication units is, for example, 2 to 30 MHz. However, employable communication bands are not limited to this and may be a signal band of 1.0 MHz or higher.

The first lowpass filter is interposed in the signal line between the output circuit and the first transformer and the second lowpass filter is interposed in the signal line between the input circuit and the second transformer. The first and the second lowpass filters allow the rectangular wave signal of given frequency (e.g., 1 kHz) outputted by the output circuit to pass through, and do not allow the communication signal (e.g., 2 to 30 MHz) transmitted and received by the first and the second communication units to pass through. When the first lowpass filter is provided between the first communication unit and the output circuit, the communication signal transmitted by the first communication unit propagates to the second communication unit without attenuation that could be caused by the capacitors of the input circuit and the output circuit. Further, when the second lowpass filter is provided between the second communication unit and the input circuit, the communication signal transmitted by the second communication unit propagates to the first communication unit without attenuation that could be caused by the capacitors of the input circuit and the output circuit. This suppresses attenuation of the communication signal superimposed on the control pilot line.

In the second aspect of the present invention, each of the first and the second lowpass filters includes an inductor connected in series to the signal line. The inductor has a low impedance at a given frequency (e.g., 1 kHz) outputted by the output circuit and a high impedance for the communication signal (e.g., 2 to 30 MHz) transmitted and received by the first and the second communication units. Thus, by employing merely a simple configuration, the communication signal transmitted and received by the first and the second communication units is cut off and the control pilot signal is passed through.

In the third aspect of the present invention, each of the first and the second lowpass filters includes a resistor connected in parallel to the inductor. When the resistor is provided, for example, the Q factor (Quality factor) representing the sharpness of the peak of resonance in the resonance circuit formed between the inductor and the capacitor provided in the output circuit or the input circuit is reduced so that unnecessary resonance is suppressed.

In the fourth aspect of the present invention, each of the first and the second lowpass filters includes a resistor connected in series to the inductor. When the resistor is provided, for example, the Q factor (Quality factor) representing the sharpness of the peak of resonance in the resonance circuit formed between the inductor and the capacitor provided in the output circuit or the input circuit is reduced so that unnecessary resonance is suppressed.

In the fifth aspect of the present invention, each of the first and the second lowpass filters includes a series circuit composed of a capacitor and a resistor between the signal lines of the output side of the inductor. By virtue of this, the Q factor (Quality factor) representing the sharpness of the peak of resonance in the resonance circuit formed between the inductor and the capacitor provided in the output circuit or the input circuit is reduced so that unnecessary resonance is suppressed.

In the sixth aspect of the present invention, the output circuit outputs a rectangular wave signal of 1 kHz. The rise time and the fall time of the rectangular wave signal on the input side of the input circuit are 10 µs or shorter. The rise time is defined as the time elapsing in the course that the rectangular wave signal rises from 10% to 90%. Further, the fall time is defined as the time elapsing in the course that the rectangular wave signal falls from 90% to 10%. In order that the rise time and the fall time should be set to be 10 µs or shorter, it is sufficient to set up the values of the first and the second lowpass filters (e.g., the values of the resistors or the inductors). When the rise time and the fall time exceed 10 µs, the rectangular wave signal received by the input circuit is distorted. This prevents the control pilot signal from being received correctly. When the rise time and the fall time are set to be 10 µs or shorter, distortion in the rectangular wave signal is reduced and hence the control pilot signal is received correctly.

In the eighth aspect of the present invention, provided are: the generation unit generating a rectangular wave signal (a control pilot signal); the voltage detection unit detecting the output voltage of the output circuit; and the adjustment unit, in accordance with the voltage detected by the voltage detection unit, adjusting the rectangular wave signal generated by the generation unit. In the rectangular wave signal, the duty ratio thereof may be changed from 0% to 100%. Thus, for example, a fixed voltage of ±12 V may be used. By virtue of this, the output circuit is allowed to output a desired control pilot signal.

In the tenth aspect of the present invention, provided are: the resistor unit including a plurality of resistors in which the resistance thereof is adjustable; and the adjustment unit, in order to change the voltage of the resistor unit, adjusting the resistance of the resistor unit. By virtue of this, for example, in accordance with the state of the vehicle, the resistance of the resistor unit is adjusted so that the voltage of the resistor unit is allowed to be changed to a desired value.

According to the present invention, a communication signal is superimposed on a control pilot line so that communication is achieved reliably.

The above and further objects and features of the invention will more fully be apparent from the following detailed description with accompanying drawings.

DETAILED DESCRIPTION (Embodiment 1)

Figure 1:
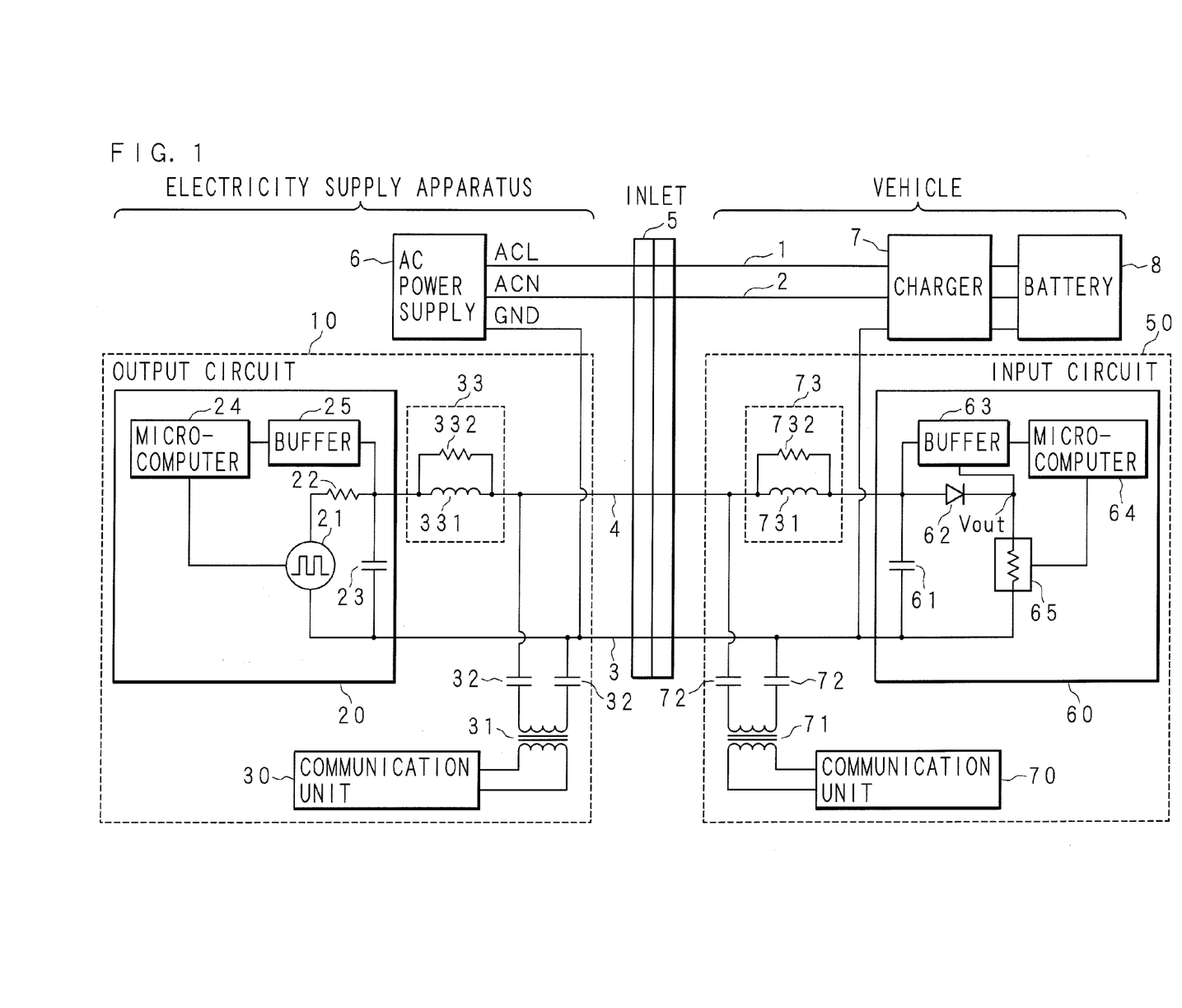
FIG. 1 is a block diagram illustrating an example of a configuration of a communication system according to Embodiment 1.

An embodiment of a communication system according to the present invention is described below with reference to the drawings. FIG. 1 is a block diagram illustrating an example of the configuration of the communication system according to Embodiment 1. As illustrated in FIG. 1, a vehicle such as an electric car and a hybrid car is electrically connected to an electricity supply apparatus via an inlet 5 (also referred to as a "power feed opening" or a "connector"). The electricity supply apparatus includes an AC power supply 6. The AC power supply 6 is electrically connected to a charger 7 of the vehicle via a power supply line 1 (ACL) and a power supply line 2 (ACN). The charger 7 is connected to a battery (a secondary battery) 8.

Thus, when a plug (not illustrated) connected to a charging cable from the electricity supply apparatus is connected to the inlet 5, AC electricity is supplied to the vehicle and hence the battery 8 mounted on the vehicle is charged.

The communication system according to the present embodiment includes: a communication device 10 provided in the electricity supply apparatus; and a communication device 50 provided in the vehicle.

The communication device 10 includes: an output circuit 20 outputting a rectangular wave signal (also referred to as a "control pilot signal") of given frequency; a communication unit 30 serving as the first communication unit; a transformer 31; coupling capacitors 32; and a first lowpass filter 33.

The communication device 50 includes: an input circuit 60 to which the control pilot signal is inputted; a communication unit 70 serving as the second communication unit; a transformer 71; coupling capacitors 72; and a second lowpass filter 73.

The output circuit 20 includes: a voltage generation source 21 serving as the generation unit generating a rectangular wave signal (a control pilot signal); a resistor 22; a capacitor 23; a microcomputer 24; and a buffer 25. The voltage generation source 21 generates a rectangular wave signal (a control pilot signal) having, for example, a frequency of 1 kHz and a peak value of ±12 V. The duty ratio of the control pilot signal is, for example, 20%. However, employable values are not limited to this. In the rectangular wave signal, the duty ratio thereof may be changed from 0% to 100%. Thus, for example, a fixed voltage of ±12 V may be used.

The output circuit 20 sends the control pilot signal to the input circuit 60 provided in the vehicle via the resistor 22.

The capacitor 23 is provided, for example, for the purpose of reducing a noise generated in the output circuit 20. For example, the value of the resistor 22 is 1.0 kΩ and the capacitance of the capacitor 23 is 2.2 nF. However, employable values are not limited to these.

The buffer 25 has the function of the voltage detection unit detecting the output voltage of the output circuit 20, and detects the voltage across the capacitor 23 and then outputs the detection result to the microcomputer 24.

The microcomputer 24 has the function of the adjustment unit adjusting the rectangular wave signal generated by the voltage generation source 21. By virtue of this, the output circuit 20 is allowed to output a fixed voltage of ±12 V or a rectangular wave signal (a control pilot signal) having an arbitrary duty ratio (greater than 0 and smaller than 100) and a peak value of ±12 V.

The input circuit 60 includes a capacitor 61, a diode 62, a buffer 63, a microcomputer 64, and a resistor unit 65. The buffer 63 detects the voltage Vout across the resistor unit 65 and then outputs the value to the microcomputer 64. Here, in place of the voltage across the resistor unit 65, the voltage across the capacitor 61 may be detected.

The resistor unit 65 includes a plurality of resistors and a plurality of open-close switches. Then, in response to a signal from the microcomputer 64, the open-close switches are opened or closed so that the resistance is changed (adjusted).

The microcomputer 64 has the function of the adjustment unit adjusting the resistance of the resistor unit 65 for the purpose of changing the voltage Vout of the resistor unit 65. That is, in order to change the voltage Vout in accordance with the state of the vehicle (e.g., a status relevant to charging), the microcomputer 64 changes the resistance of the resistor unit 65. In accordance with the value of the voltage Vout, the electricity supply apparatus and the vehicle are allowed to detect the status relevant to charging.

For example, when the voltage Vout is 12 V, a state is indicated that the charging plug of the vehicle is not yet connected. Further, when the voltage Vout is 9 V, the resistance of the resistor unit 65 is set to be 2.74 kΩ and a state is indicated that the charging plug of the vehicle is connected and charging is ready. Further, when the voltage Vout is 6 V, the resistance of the resistor unit 65 is set to be 882Ω and a state is indicated that charging is on-going. Further, when the voltage Vout is 3 V, the resistance of the resistor unit 65 is set to be 246Ω and a state is indicated that charging is on-going and ventilation is necessary in the charging site.

The capacitor 61 is provided, for example, for the purpose of reducing a noise entering the input circuit 60. For example, the resistance of the resistor unit 65 is 2.74 kΩ, 882 Ω, 246Ω, or the like and the capacitance of the capacitor 61 is 1.8 nF. However, employable values are not limited to these.

The output circuit 20 and the input circuit 60 are electrically connected to each other via a plurality of signal lines (a control pilot line 4 and a ground line 3). Here, the ground line 3 may also be regarded as a control pilot line.

The communication unit 30 and the communication unit 70 perform communication with each other by superimposing a given communication signal on the plurality of signal lines (the control pilot line 4 and the ground line 3) provided between the output circuit 20 and the input circuit 60. The information transmitted and received between the communication unit 30 and the communication unit 70 has larger diversity than the information exchanged by using the control pilot signal, like information relevant to a vehicle ID, charging control (e.g., start or end of charging), management of the charging amount (e.g., boosted charging and notification of the charging amount), management of accounting, and update of navigation.

Each of the communication unit 30 and the communication unit 70 includes a modulation circuit and a demodulator circuit employing a modulation method such as OFDM (Orthogonal Frequency Domain Multiplex) and SS (Spread Spectrum).

The communication band of the communication performed by the communication unit 30 and the communication unit 70 is, for example, 2 to 30 MHz (e.g., Home Plug Green PHY). However, employable communication bands are not limited to this and may be a communication band higher than 1.0 MHz.

A series circuit constructed from the coupling capacitors 32 and 32 and the transformer 31 is connected between the control pilot line 4 and the ground line 3 of the output side of the output circuit 20. Then, the communication unit 30 superimposes a communication signal onto the control pilot line 4 via the transformer 31 and receives a communication signal on the control pilot line 4.

A series circuit constructed from the coupling capacitors 72 and 72 and the transformer 71 is connected between the control pilot line 4 and the ground line 3 of the input side of the input circuit 60. Then, the communication unit 70 superimposes a communication signal onto the control pilot line 4 via the transformer 71 and receives a communication signal on the control pilot line 4.

That is, in the communication unit 30 and the communication unit 70, the transformer 31 or 71 is connected between the signal lines and then a voltage is superimposed between the signal lines so that communication is achieved. This method may be referred to as an interline communication method.

The lowpass filter 33 is interposed in the control pilot line 4 between the output circuit 20 and the point of connection of the transformer 31 connected via the coupling capacitor 32.

Further, the lowpass filter 73 is interposed in the control pilot line 4 between the input circuit 60 and the point of connection of the transformer 71 connected via the coupling capacitor 72. The capacitances of the coupling capacitors 32 and 72 are, for example, 500 pF. However, employable values are not limited to this.

The lowpass filters 33 and 73 allow the rectangular wave signal (control pilot signal) of given frequency (e.g., 1 kHz) outputted by the output circuit 20 to pass through, and do not allow the communication signal (e.g., 2 to 30 MHz) transmitted and received by the communication units 30 and 70 to pass through.

When the lowpass filter 33 is provided between the communication unit 30 and the output circuit 20, the communication signal transmitted by the communication unit 30 propagates to the communication unit 70 without attenuation that could be caused by the capacitor 23 of the output circuit 20. Further, the communication signal transmitted by the communication unit 70 propagates to the communication unit 30 without attenuation that could be caused by the capacitor 23 of the output circuit 20.

Further, when the lowpass filter 73 is provided between the communication unit 70 and the input circuit 60, the communication signal transmitted by the communication unit 70 propagates to the communication unit 30 without attenuation that could be caused by the capacitor 61 of the input circuit 60. Further, the communication signal transmitted by the communication unit 30 propagates to the communication unit 70 without attenuation that could be caused by the capacitor 61 of the input circuit 60. Thus, the communication signal is superimposed on the control pilot line 4 so that communication is achieved reliably. Further, distortion is not enhanced in the control pilot signal and errors are avoided in reading the control pilot signal that could be caused by the communication signal.

The lowpass filter 33 includes an inductor 331 connected in series to the control pilot line 4. The inductance of the inductor 331 is, for example, 1.5 mH. However, employable inductance values are not limited to this.

The inductor 331 has a low impedance at a given frequency (e.g., 1 kHz) of the output of the output circuit 20. Further, the inductor 331 has a high impedance for the communication signal (e.g., 2 to 30 MHz) transmitted and received by the communication units 30 and 70. Thus, by employing merely a simple configuration, the communication signal transmitted and received by the communication units 30 and 70 is cut off and the control pilot signal is passed through.

The lowpass filter 73 includes an inductor 731 connected in series to the control pilot line 4. The inductance of the inductor 731 is, for example, 1.5 mH. However, employable inductance values are not limited to this.

The inductor 731 has a low impedance at a given frequency (e.g., 1 kHz) of the output of the output circuit 20. Further, the inductor 731 has a high impedance for the communication signal (e.g., 2 to 30 MHz) transmitted and received by the communication units 30 and 70. Thus, by employing merely a simple configuration, the communication signal transmitted and received by the communication units 30 and 70 is cut off and the control pilot signal is passed through.

Further, the lowpass filter 33 includes a resistor 332 connected in parallel to the inductor 331. The resistance of the resistor 332 is, for example, 1 kΩ. However, employable values are not limited to this. When the resistor 332 is provided, for example, the Q factor (Quality factor) representing the sharpness of the peak of resonance in the resonance circuit formed between the inductor 331 and the capacitor 23 and the like provided in the output circuit 20 is reduced so that unnecessary resonance is suppressed.

Similarly, the lowpass filter 73 includes a resistor 732 connected in parallel to the inductor 731. The resistance of the resistor 732 is, for example, 1 kΩ. However, employable values are not limited to this. When the resistor 732 is provided, for example, the Q factor (Quality factor) representing the sharpness of the peak of resonance in the resonance circuit formed between the inductor 731 and the capacitor 61 and the like provided in the input circuit 60 is reduced so that unnecessary resonance is suppressed.

Figure 2:
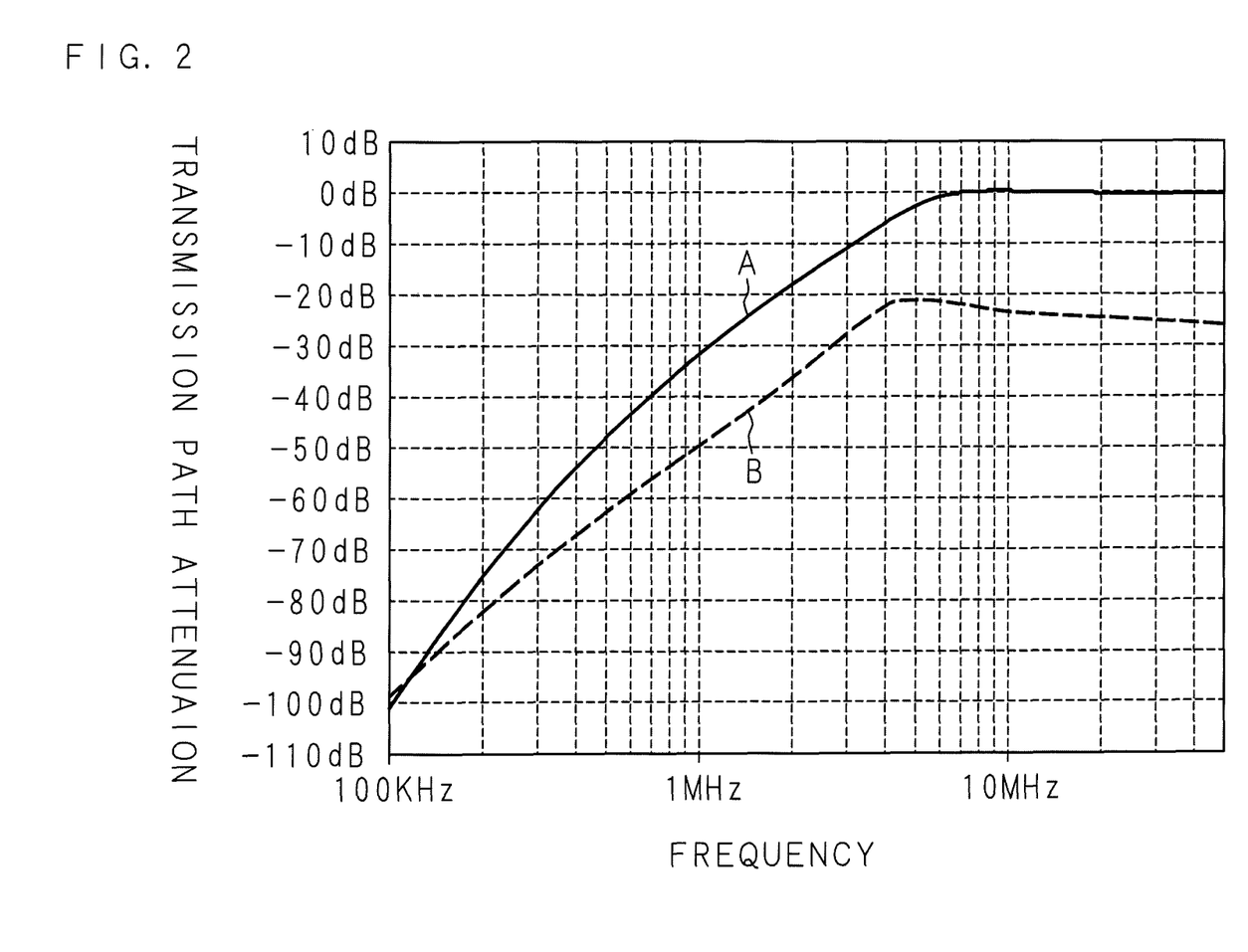
FIG. 2 is an explanation diagram illustrating an example of transmission path attenuation characteristics in communication performed by communication units.

FIG. 2 is an explanation diagram illustrating an example of transmission path attenuation characteristics in the communication performed by the communication units 30 and 70. In FIG. 2, the horizontal axis indicates the frequency and the vertical axis indicates the magnitude of transmission path attenuation (the voltage drop) in the control pilot line 4 between the communication units 30 and 70. Further, in FIG.

2, the curve indicated by symbol A corresponds to a case that the lowpass filters 33 and 73 are provided, and the curve indicated by symbol B corresponds to a case that the lowpass filters 33 and 73 are not provided.

As seen from FIG. 2, when the lowpass filters 33 and 73 are provided, the magnitude of attenuation in the communication signal caused by the communication units 30 and 70 is improved in a range from 150 kHz to 50 MHz in comparison with a case that the lowpass filters 33 and 73 are not provided. Specifically, the improvement is approximately 20 dB at 2 MHz and approximately 25 dB at 30 MHz. Thus, improvement of approximately 20 dB to 25 dB is achieved in the range from 2 to 30 MHz which is the communication band of the communication units 30 and 70.

Figure 3:
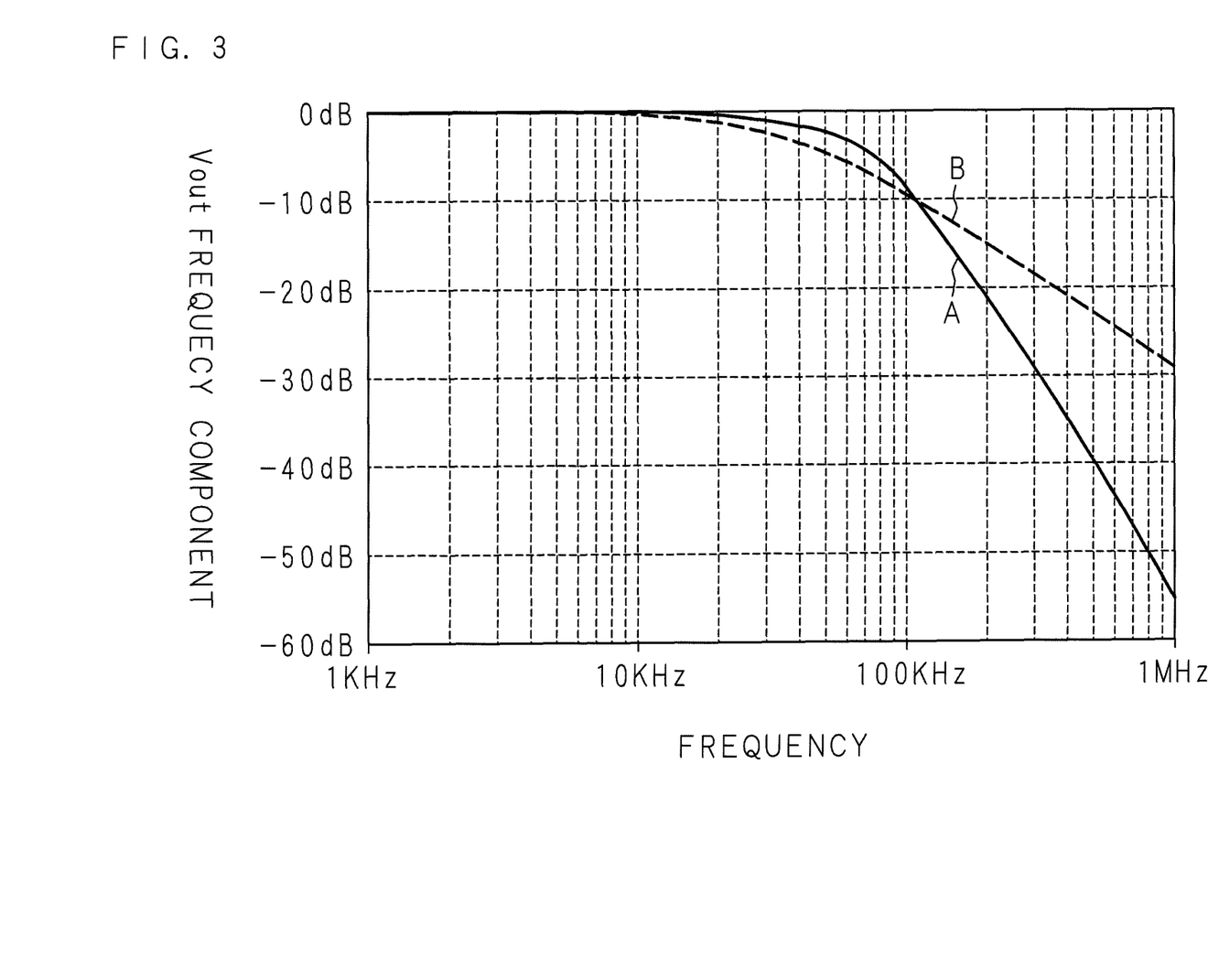
FIG. 3 is an explanation diagram illustrating an example of attenuation characteristics of the control pilot signal outputted by an output circuit.

FIG. 3 is an explanation diagram illustrating an example of attenuation characteristics of the control pilot signal outputted by the output circuit 20. In FIG. 3, the horizontal axis indicates the frequency and the vertical axis indicates the frequency component (the spectrum) of the voltage Vout. Further, in FIG. 3, the curve indicated by symbol A corresponds to a case that the lowpass filters 33 and 73 are provided, and the curve indicated by symbol B corresponds to a case that the lowpass filters 33 and 73 are not provided.

As seen from FIG. 3, at frequencies of 10 kHz or lower, attenuation characteristics are the same regardless of the provision or omission of the lowpass filters 33 and 73. That is, even when the lowpass filters 33 and 73 are provided, similarly to a case that the lowpass filters 33 and 73 are not provided, up to the tenth higher harmonics of frequency 1 kHz are allowed to pass through completely without attenuation. Further, in a case that the lowpass filters 33 and 73 are provided, when the frequency is lower than approximately 100 kHz, the magnitude of attenuation of the control pilot signal is reduced in comparison with a case that the lowpass filters 33 and 73 are not provided.

In other words, in a case that the frequency of the control pilot signal is adopted as the fundamental wave, when the cut-off frequencies of the lowpass filters 33 and 73 are set to be, for example, the ninth higher harmonic (9 kHz) or higher, the eleventh higher harmonic (11 kHz) or higher, or alternatively the fifteenth higher harmonic (15 kHz) or higher, waveform distortion or voltage fluctuation is suppressed in the control pilot signal. A higher cut-off frequency has a larger effect in suppressing the waveform distortion or the voltage fluctuation in the control pilot signal.

Figure 4:
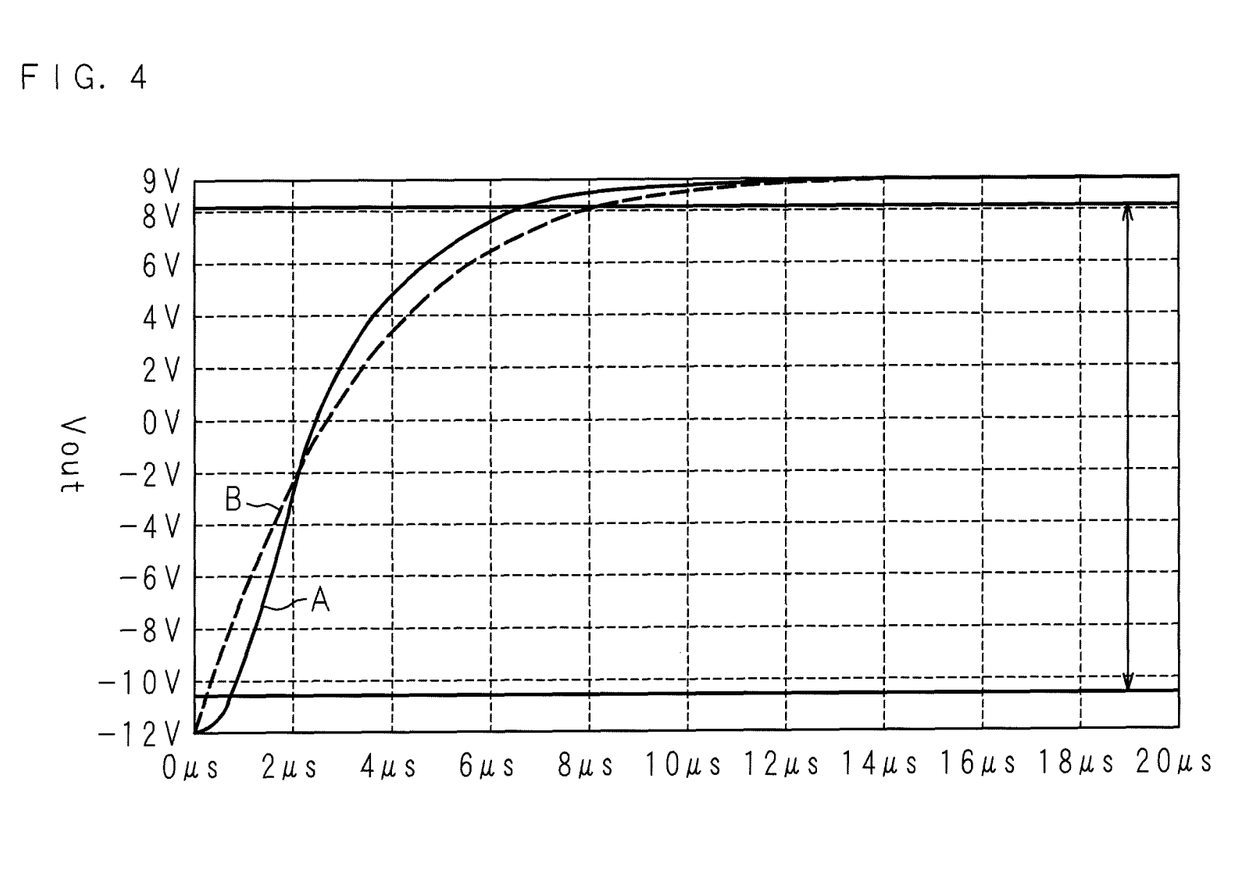
FIG. 4 is an explanation diagram illustrating an example of rise characteristics of a control pilot signal in an input circuit.

FIG. 4 is an explanation diagram illustrating an example of rise characteristics of the control pilot signal in the input circuit 60. In FIG. 4, the horizontal axis indicates the time and the vertical axis indicates the voltage Vout. Here, in FIG. 4, the voltage Vout indicates the voltage across the capacitor 61. In FIG. 4, the curve indicated by symbol A corresponds to a case that the lowpass filters 33 and 73 are provided, and the curve indicated by symbol B corresponds to a case that the lowpass filters 33 and 73 are not provided. As a result of voltage dividing by the resistances of the output circuit 20 and the input circuit 60, the control pilot signal in the input circuit 60 becomes a rectangular waveform of frequency 1 kHz and voltages +9 V and −12 V. Further, the rise time is defined as the time elapsing in the course that the voltage rises from 10% to 90%.

As seen from FIG. 4, when the lowpass filters 33 and 73 are not provided, the rise time is approximately 7.7 μs. In contrast, when the lowpass filters 33 and 73 are provided, the rise time is approximately 5.6 μs. That is, the rise time of the control pilot signal on the input side of the input circuit 60 is shorter than 10 μs.

In order that the rise time should be set to be 10 μs or shorter, it is sufficient to set up the values of the lowpass filters 33 and 73 (e.g., the values of the inductors 331 and 731 or the resistors 332 and 732). When the rise time exceeds 10 μs, excessively large distortion occurs in the voltage waveform received by the input circuit 20. This prevents the control pilot signal from being received correctly. When the rise time is set to be 10 μs or shorter, distortion in the voltage waveform is reduced and hence the control pilot signal is received correctly. That is, the control pilot signal of rectangular waveform outputted by the output circuit 20 is transmitted to the input circuit 60 without distortion. Here, the example of FIG. 4 has been described for the rise time. However, the same situation holds also for the fall time.

Figure 5:
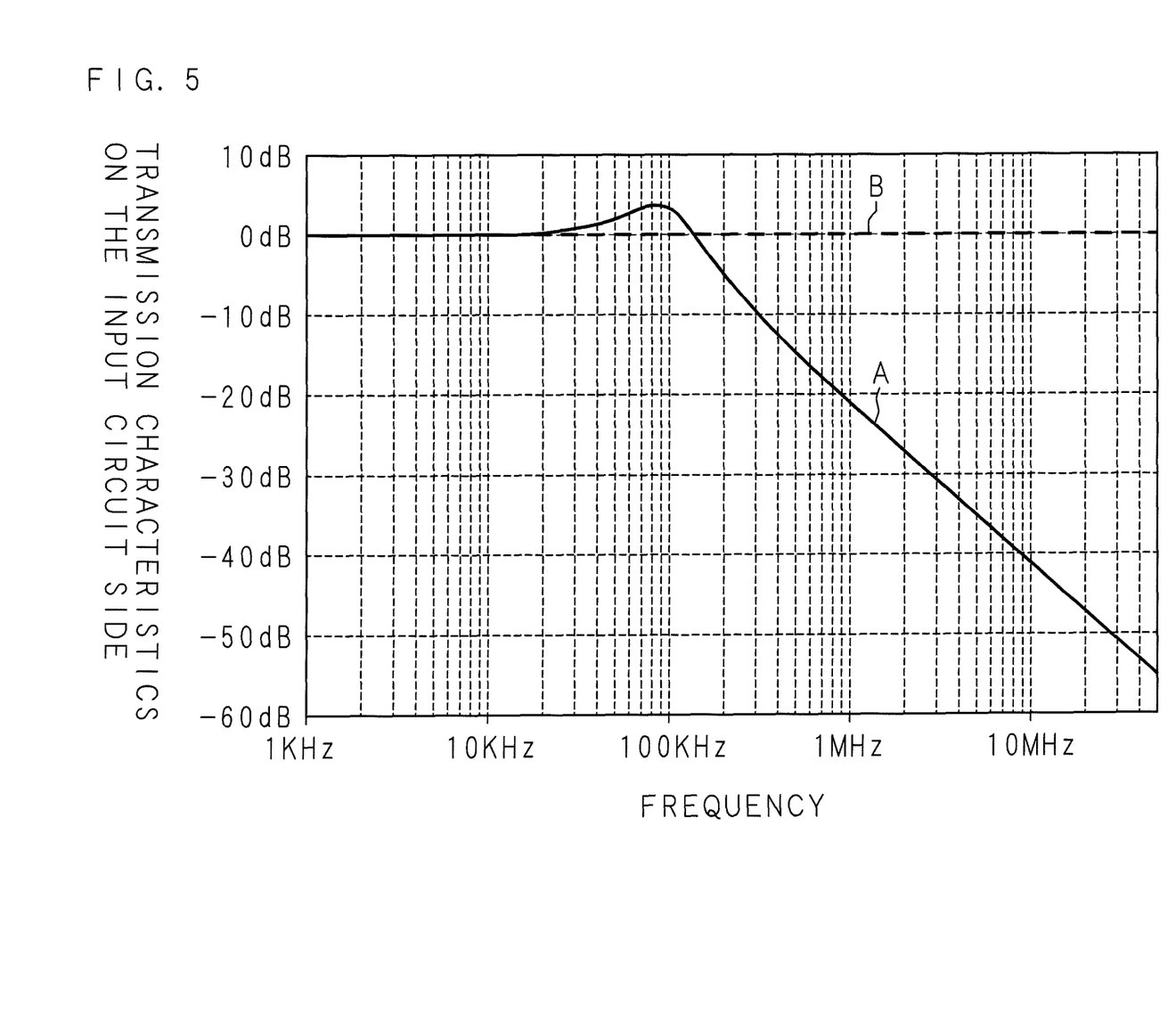
FIG. 5 is an explanation diagram illustrating an example of transmission characteristics on the input circuit side.

FIG. 5 is an explanation diagram illustrating an example of transmission characteristics on the input circuit side. In FIG. 5, the horizontal axis indicates the frequency. The vertical axis indicates the frequency components of the control pilot signal from the output circuit 20 and the communication signal from the communication units 30 and 70 observed at the voltage Vout on the input circuit 60 side. In FIG. 5, the curve indicated by symbol A corresponds to a case that the lowpass filters 33 and 73 are provided, and the curve indicated by symbol B corresponds to a case that the lowpass filters 33 and 73 are not provided.

As seen from FIG. 5, when the lowpass filters 33 and 73 are not provided, the communication signal from the communication units 30 and 70 invades the input circuit 60 side intact without attenuation. Thus, when voltage detection (e.g., 12 V, 9 V, 6 V, and 3 V) is performed in the buffer 63 and the microcomputer 64, the communication signal acts as a noise of external disturbance and hence causes a possibility of error in the voltage judgment. In contrast, when the lowpass filters 33 and 73 are provided, for example, the communication signal of 2 to 30 MHz is attenuated into a few tenth to a few hundredths. However, the control pilot signal is received by the input circuit 60 almost free from attenuation and distortion. Thus, the voltage judgment and the duty ratio judgment for the control pilot signal are not affected.

In the above-mentioned examples of FIGS. 2 to 5, the self-inductances of the transformers on the coupling capacitors 32 and 72 side and on the communication units 30 and 70 side have been 9.9 μH each. The inductances of the inductors 331 and 731 of the lowpass filters 33 and 73 have been 1.5 mH. The resistances of the resistors 332 and 732 have been 1 kΩ. The capacitances of the coupling capacitors 32 and 72 have been 500 pF. However, employable values are not limited to these. The flowing description is given for a case that the self-inductances of the transformers on the coupling capacitors 32 and 72 side are 130 μH, the self-inductances of the transformers on the communication units 30 and 70 side are 6 μH, the inductances of the inductors 331 and 731 of the lowpass filters 33 and 73 are 470 μH, the resistances of the resistors 332 and 732 are 470Ω, and the capacitances of the coupling capacitors 32 and 72 are 100 pF.

Figure 6:
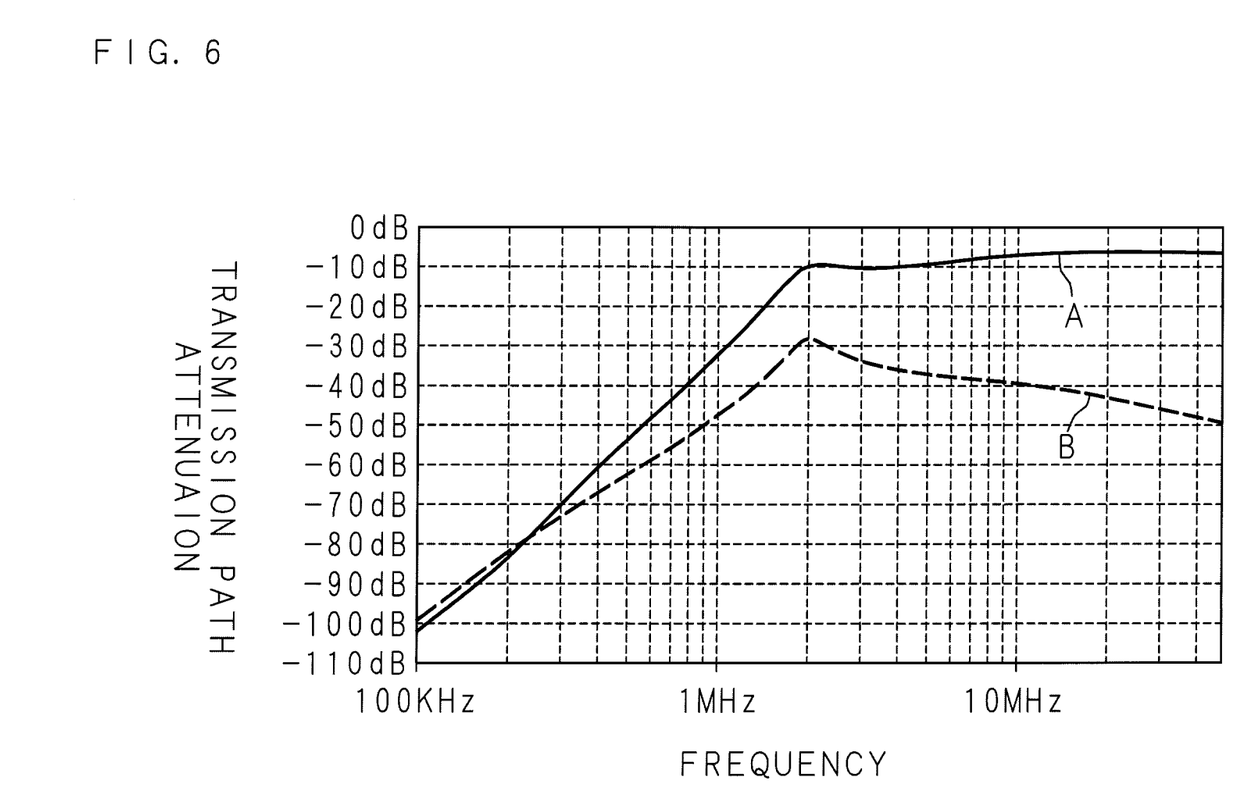
FIG. 6 is an explanation diagram illustrating another example of transmission path attenuation characteristics in communication performed by communication units.

FIG. 6 is an explanation diagram illustrating another example of transmission path attenuation characteristics in the communication performed by the communication units 30 and 70. In FIG. 6, the horizontal axis indicates the frequency and the vertical axis indicates the magnitude of transmission path attenuation (the voltage drop) in the control pilot line 4 between the communication units 30 and 70. Further, in FIG. 6, the curve indicated by symbol A corresponds to a case that the lowpass filters 33 and 73 are provided, and the curve indicated by symbol B corresponds to a case that the lowpass filters 33 and 73 are not provided.

As seen from FIG. 6, when the lowpass filters 33 and 73 are provided, the magnitude of attenuation in the communication signal caused by the communication units 30 and 70 is improved in a range from 250 kHz to 50 MHz in comparison with a case that the lowpass filters 33 and 73 are not provided. Specifically, the improvement is approximately 20 dB at 2 MHz and approximately 40 dB at 30 MHz. Thus, improvement of approximately 20 dB to 40 dB is achieved in the range from 2 to 30 MHz which is the communication band of the communication units 30 and 70.

Figure 7:
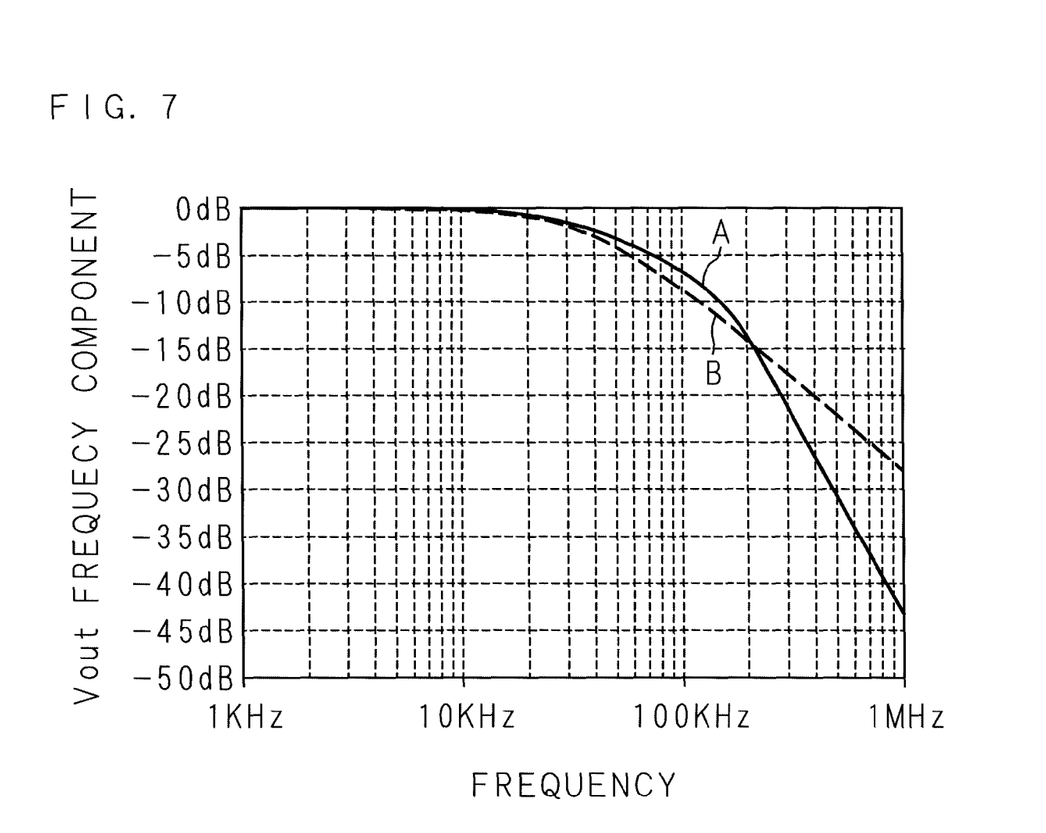
FIG. 7 is an explanation diagram illustrating another example of attenuation characteristics of the control pilot signal outputted by an output circuit.

FIG. 7 is an explanation diagram illustrating another example of attenuation characteristics of the control pilot signal outputted by the output circuit 20. In FIG. 7, the horizontal axis indicates the frequency and the vertical axis indicates the frequency component (the spectrum) of the voltage Vout. Further, in FIG. 7, the curve indicated by symbol A corresponds to a case that the lowpass filters 33 and 73 are provided, and the curve indicated by symbol B corresponds to a case that the lowpass filters 33 and 73 are not provided.

As seen from FIG. 7, at frequencies of 20 kHz or lower, attenuation characteristics are the same regardless of the provision or omission of the lowpass filters 33 and 73. That is, even when the lowpass filters 33 and 73 are provided, similarly to a case that the lowpass filters 33 and 73 are not provided, up to the twentieth higher harmonics of frequency 1 kHz are allowed to pass through completely without attenuation.

In other words, in a case that the frequency of the control pilot signal is adopted as the fundamental wave, when the cut-off frequency of the lowpass filters 33 and 73 is set to be, for example, the ninth higher harmonic (9 kHz) or higher, the eleventh higher harmonic (11 kHz) or higher, or alternatively the fifteenth higher harmonic (15 kHz) or higher, waveform distortion or voltage fluctuation is suppressed in the control pilot signal. A higher cut-off frequency has a larger effect in suppressing the waveform distortion or the voltage fluctuation in the control pilot signal.

Figure 8:
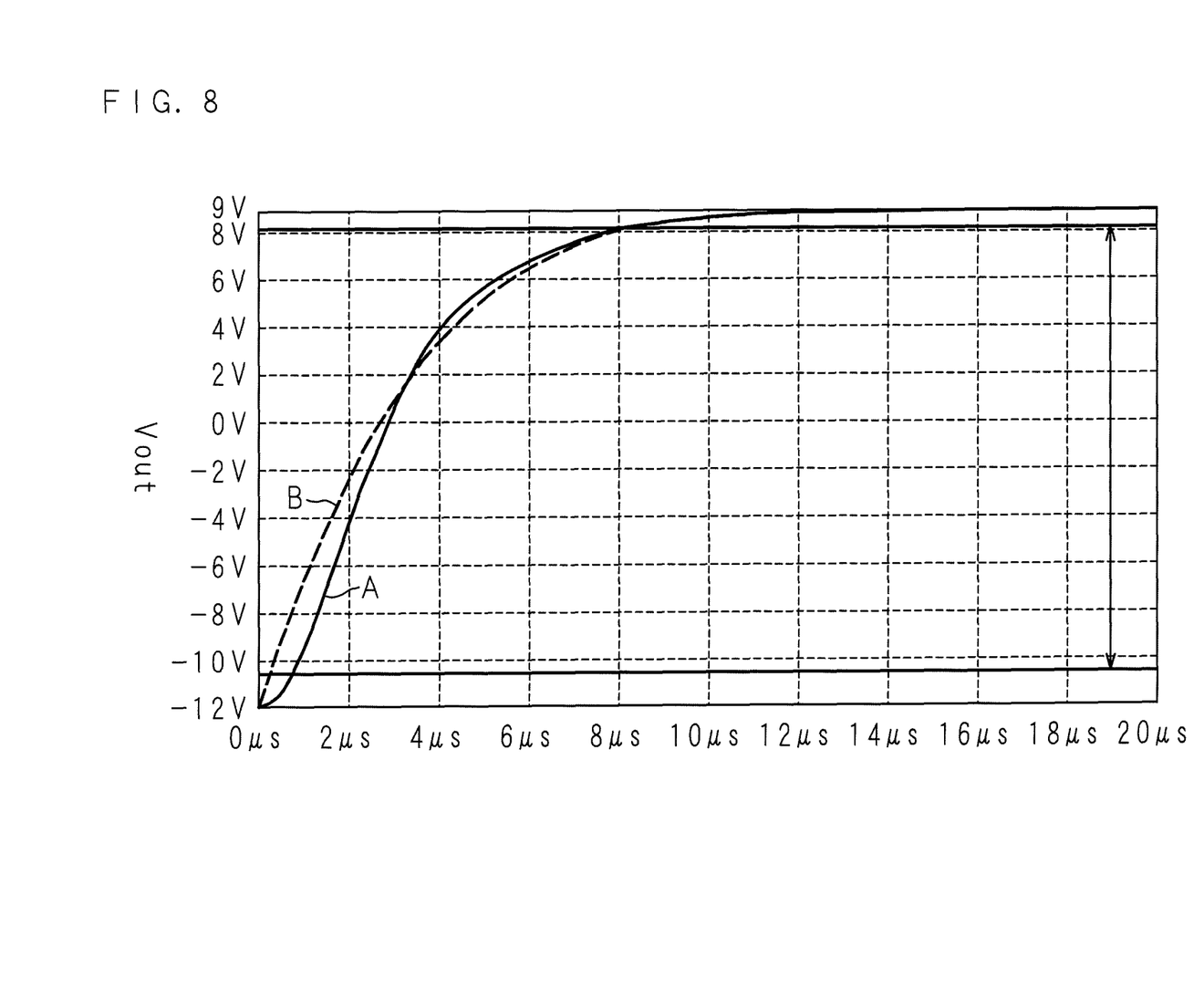
FIG. 8 is an explanation diagram illustrating another example of rise characteristics of a control pilot signal in an input circuit.

FIG. 8 is an explanation diagram illustrating another example of rise characteristics of the control pilot signal in the input circuit 60. In FIG. 8, the horizontal axis indicates the time and the vertical axis indicates the voltage Vout. Here, in FIG. 8, the voltage Vout indicates the voltage across the capacitor 61. In FIG. 8, the curve indicated by symbol A corresponds to a case that the lowpass filters 33 and 73 are provided, and the curve indicated by symbol B corresponds to a case that the lowpass filters 33 and 73 are not provided. As a result of voltage dividing by the resistances of the output circuit 20 and the input circuit 60, the control pilot signal in the input circuit 60 becomes a rectangular waveform of frequency 1 kHz and voltages +9 V and −12 V. Further, the rise time is defined as the time elapsing in the course that the voltage rises from 10% to 90%.

As seen from FIG. 8, when the lowpass filters 33 and 73 are not provided, the rise time is approximately 7.7 μs. In contrast, when the lowpass filters 33 and 73 are provided, the rise time is approximately 7.2 μs. That is, the rise time of the control pilot signal on the input side of the input circuit 60 is shorter than 10 μs.

In order that the rise time should be set to be 10 μs or shorter, it is sufficient to set up the values of the lowpass filters 33 and 73 (e.g., the values of the inductors 331 and 731 or the resistors 332 and 732). When the rise time exceeds 10 μs, excessively large distortion occurs in the voltage waveform received by the input circuit 60. This prevents the control pilot signal from being received correctly. When the rise time is set to be 10 μs or shorter, distortion in the voltage waveform is reduced and hence the control pilot signal is received correctly. That is, the control pilot signal of rectangular waveform outputted by the output circuit 20 is transmitted to the input circuit 60 without distortion. Here, the example of FIG. 8 has been described for the rise time. However, the same situation holds also for the fall time.

Figure 9:
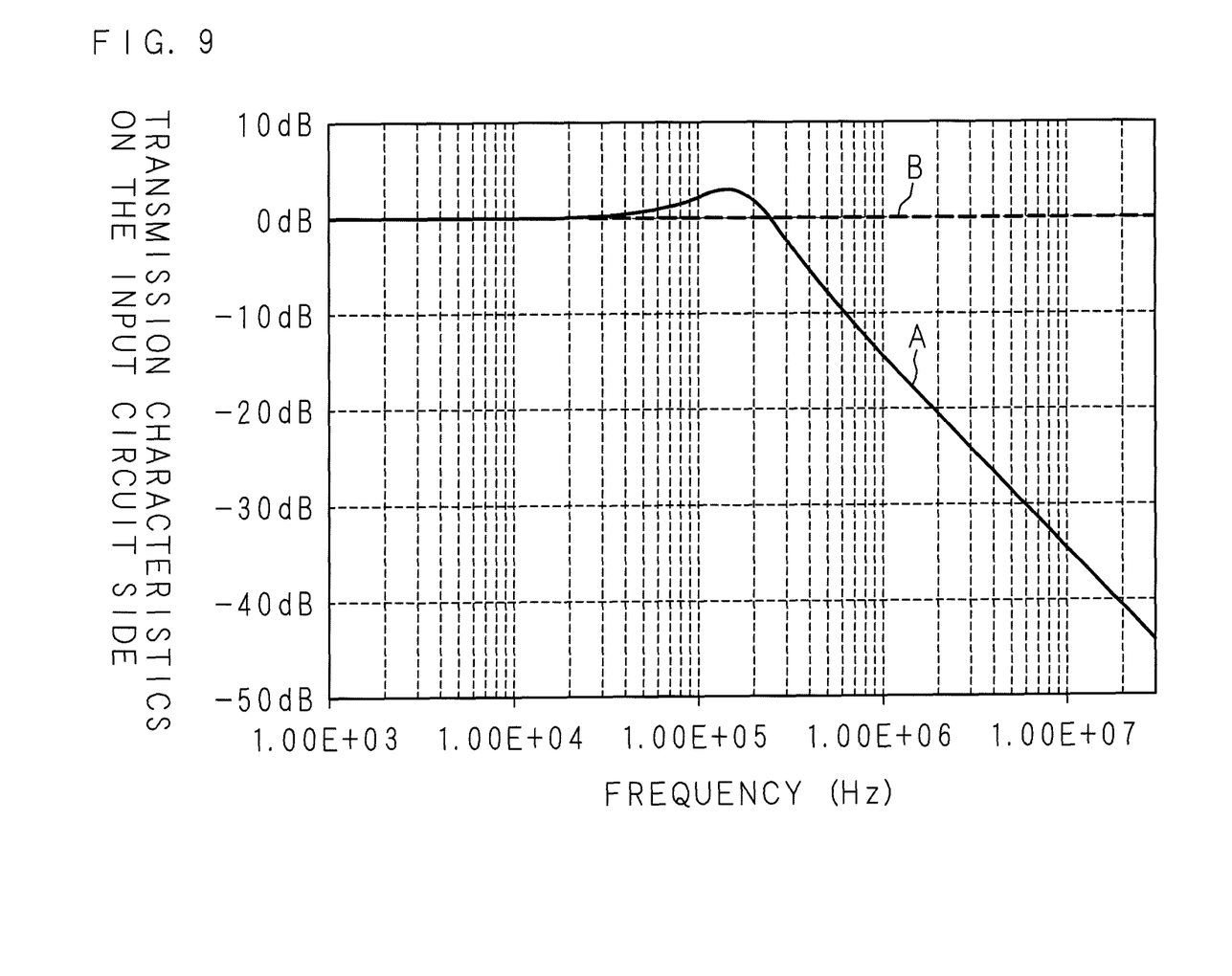
FIG. 9 is an explanation diagram illustrating another example of transmission characteristics on the input circuit side.

FIG. 9 is an explanation diagram illustrating another example of transmission characteristics on the input circuit side. In FIG. 9, the horizontal axis indicates the frequency. The vertical axis indicates the frequency components of the control pilot signal from the output circuit 20 and the communication signal from the communication units 30 and 70 observed at the voltage Vout on the input circuit 60 side. In FIG. 9, the curve indicated by symbol A corresponds to a case that the lowpass filters 33 and 73 are provided, and the curve indicated by symbol B corresponds to a case that the lowpass filters 33 and 73 are not provided.

As seen from FIG. 9, when the lowpass filters 33 and 73 are not provided, the communication signal from the communication units 30 and 70 invades the input circuit 60 side intact without attenuation. Thus, when voltage detection (e.g., 12 V, 9 V, 6 V, and 3 V) is performed in the buffer 63 and the microcomputer 64, the communication signal acts as a noise of external disturbance and hence causes a possibility of error in the voltage judgment. In contrast, when the lowpass filters 33 and 73 are provided, for example, the communication signal of 2 to 30 MHz is attenuated into a few tenth to a few hundredths. However, the control pilot signal is received by the input circuit 60 almost free from attenuation and distortion. Thus, the voltage judgment and the duty ratio judgment for the control pilot signal are not affected.

According to the present embodiment, when the lowpass filters 33 and 73 are provided, the communication signal transmitted and received by the communication units 30 and 70 is not attenuated in the output circuit 20 or the input circuit 60. This suppresses attenuation of the communication signal superimposed on the control pilot line. Further, this avoids degradation in the transmission speed of communication or degradation in the noise resistance that could be caused by the communication units 30 and 70.

Further, the capacitances of the coupling capacitors 32 and 72 need not be changed. Thus, the impedances of the communication units 30 and 70 measured from the output circuit 20 do not vary. That is, if the capacitances of the coupling capacitors 32 and 72 were increased, the voltage drops in the coupling capacitors 32 and 72 could be reduced in the communication band (2 to 30 MHz in high-speed PLC) and hence the attenuation characteristics could be improved but large distortion would be generated in the control pilot signal. In contrast, actually, since the capacitances of the coupling capacitors 32 and 72 are not changed, occurrence of distortion is avoided in the control pilot signal outputted by the output circuit 20.

In the above-mentioned embodiment, each lowpass filter has been composed of a parallel circuit of an inductor and a resistor. However, employable circuit configurations are not limited to this. That is, an inductor alone may be employed. Alternatively, a series circuit of an inductor and a resistor may be employed. Further, the signal lines consisting of the control pilot line and the ground line have been employed as the communication path for the rectangular wave signal or the communication signal. Instead, any one of both may be constructed from a conductor such as the car body and the housing of the electricity supply apparatus. Further, the lowpass filters may have the following configuration.

(Embodiment 2)

Figure 10:
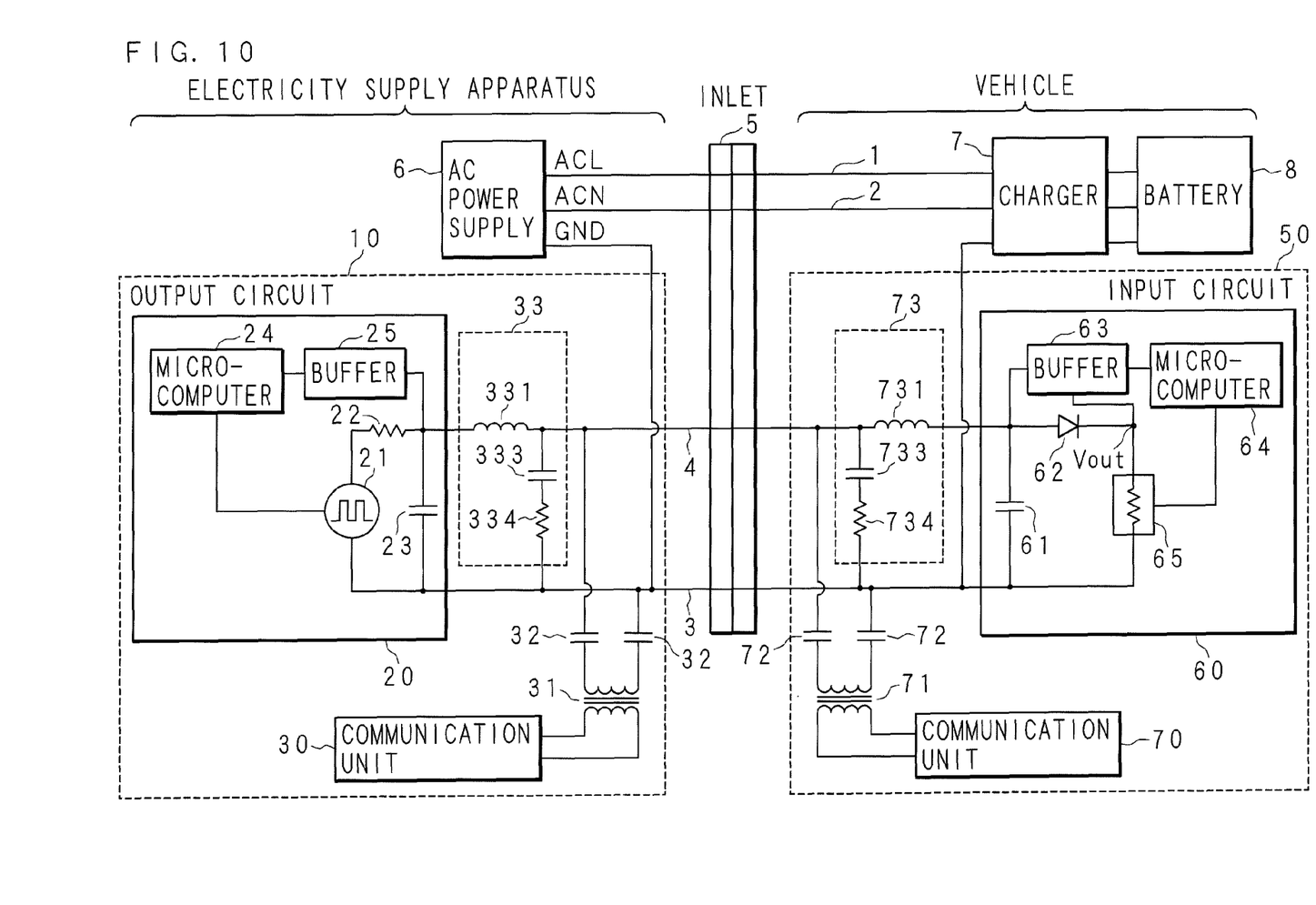
FIG. 10 is a block diagram illustrating an example of a configuration of a communication system according to Embodiment 2.

FIG. 10 is a block diagram illustrating an example of the configuration of a communication system according to Embodiment 2. The difference from Embodiment 1 is that the lowpass filter 33 includes an inductor 331 and a series circuit constructed from a capacitor 333 and a resistor 334 connected between the control pilot line 4 and the ground line 3. Similarly, the lowpass filter 73 includes an inductor 731 and a series circuit constructed from a capacitor 733 and a resistor 734 connected between the control pilot line 4 and the ground line 3. Here, like parts to Embodiment 1 are designated by like numerals and their description is omitted.

By virtue of this configuration, the Q factor (Quality factor) representing the sharpness of the peak of resonance in the resonance circuit formed between the inductor and the capacitor provided in the output circuit or the input circuit is reduced so that unnecessary resonance is suppressed.

The present embodiment may be applied to communication performed in a communication band of 2 to 30 MHz. However, adoptable applications are not limited to this. That is, a communication band high than 1.0 MHz may be adopted. Further, the signal lines consisting of the control pilot line and the ground line have been employed as the communication path for the rectangular wave signal or the communication signal. Instead, any one of both may be constructed from a conductor such as the car body and the housing of the electricity supply apparatus.

The embodiments disclosed above shall be regarded as illustrative and not restrictive at all points. The scope of the present invention shall be defined in the claims rather than the description given above. Modifications of any kind that falls within or is equivalent to the scope of the claims shall be incorporated into the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. (US Only)

The invention claimed is:

1. A communication system provided with an output circuit that is provided in an electricity supply apparatus supplying electricity to a vehicle and that outputs a rectangular wave signal of given frequency and with an input circuit that is provided in the vehicle and connected to the output circuit through a plurality of signal lines and that receives the rectangular wave signal outputted by the output circuit, whereby a communication signal is superimposed on the signal lines so that communication is achieved between the vehicle and the electricity supply apparatus, the communication system comprising:

a first communication unit provided in the electricity supply apparatus and transmitting and receiving a communication signal via a first transformer connected between the signal lines;

a second communication unit provided in the vehicle and transmitting and receiving a communication signal via a second transformer connected between the signal lines;

a first lowpass filter interposed between the output circuit and the first transformer; and a second lowpass filter interposed between the input circuit and the second transformer, wherein
   the output circuit outputs a rectangular wave signal of 1 kHz; and
   a rise time and a fall time of the rectangular wave signal on an input side of the input circuit are 10 μs or shorter.

2. The communication system according to claim 1, wherein
   each of the first and the second lowpass filters
   includes an inductor connected in series to the signal line.

3. The communication system according to claim 2, wherein
   each of the first and the second lowpass filters
   includes a resistor connected in parallel to the inductor.

4. The communication system according to claim 2, wherein
   each of the first and the second lowpass filters
   includes a resistor connected in series to the inductor.

5. The communication system according to claim 2, wherein
   in each of the first and the second lowpass filters,
   a series circuit composed of a capacitor and a resistor is provided between the signal lines of an output side of the inductor.

6. A communication device provided with an output circuit outputting a rectangular wave signal of given frequency via a plurality of signal lines, comprising:

a communication unit superimposing a communication signal onto the signal lines via a transformer connected between the signal lines and thereby transmitting and receiving a communication signal; and a lowpass filter interposed between the output circuit and the transformer, wherein
   the output circuit outputs a rectangular wave signal of 1 kHz; and
   a rise time and a fall time of the rectangular wave signal on an input side of an input circuit that receives the rectangular wave signal are 10 μs or shorter.

7. The communication device according to claim 6, comprising:
   a generation unit generating the rectangular wave signal;
   a voltage detection unit detecting an output voltage of the output circuit; and
   an adjustment unit, in accordance with the voltage detected by the voltage detection unit, adjusting the rectangular wave signal generated by the generation unit.

* * * * *